United States Patent
Shimizu (10) Patent No.: US 9,170,332 B2
(45) Date of Patent: Oct. 27, 2015

(54) RISK CALCULATION APPARATUS

(75) Inventor: Masayuki Shimizu, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 293 days.

(21) Appl. No.: 13/697,201

(22) PCT Filed: May 10, 2010

(86) PCT No.: PCT/JP2010/057885
§ 371 (c)(1),
(2), (4) Date: Nov. 13, 2012

(87) PCT Pub. No.: WO2011/141984
PCT Pub. Date: Nov. 17, 2011

(65) Prior Publication Data
US 2013/0060548 A1 Mar. 7, 2013

(51) Int. Cl.
*G06F 17/50* (2006.01)
*B60Q 9/00* (2006.01)
*G01S 17/02* (2006.01)
*B60Q 5/00* (2006.01)
(Continued)

(52) U.S. Cl.
CPC .............. *G01S 17/023* (2013.01); *B60Q 5/006* (2013.01); *B60Q 9/008* (2013.01); *G01S 13/865* (2013.01); *G01S 13/867* (2013.01); *G01S 17/936* (2013.01); *G08G 1/166* (2013.01)

(58) Field of Classification Search
CPC .... G06F 17/5009; B60Q 9/008; B60Q 5/006; G08G 1/167
USPC .......... 703/2; 701/300, 301; 340/436
See application file for complete search history.

(56) References Cited

U.S. PATENT DOCUMENTS 6,714,213 B1 * 3/2004 Lithicum et al. ............... 715/701
7,441,198 B2 * 10/2008 Dempski et al. ............... 715/757
(Continued)

FOREIGN PATENT DOCUMENTS

JP    10 221451    8/1998
JP    2007 204044    8/2007
(Continued)

OTHER PUBLICATIONS

International Search Report Issued Jun. 1, 2010 in PCT/JP10/57885 Filed May 10, 2010.

*Primary Examiner* — Thai Phan
(74) *Attorney, Agent, or Firm* — Oblon, McClelland, Maier & Neustadt, L.L.P.

(57) ABSTRACT

A moving object risk calculation unit calculates the total value at all points of intersection of a mesh M for the risk due to moving objects at each point of intersection on the basis of the risk due to objects at each point of intersection in the plurality of meshes set in the vicinity of a host vehicle. In this manner, it is possible to acquire the risk due to moving objects, such as another vehicle that is traveling or is stationary or a pedestrian who is walking or is stationary. In addition, a moving object risk calculation unit calculates the total value of the risk due to moving objects at all points of intersection of the mesh by subtracting the total value of the risk due to immovable objects, which is fixed at each point of intersection, at all points of intersection of the mesh from the total value of the risk due to objects. Therefore, since it is not necessary to distinguish between movable objects and immovable objects at each point of intersection of the mesh, the moving object risk calculation unit can calculate the total value of the risk due to moving objects with less computational load.

6 Claims, 8 Drawing Sheets (51) Int. Cl.
*G01S 17/93* (2006.01)
*G08G 1/16* (2006.01)
*G01S 13/86* (2006.01)

(56) References Cited

U.S. PATENT DOCUMENTS

| | | | |
|---|---|---|---|
| 8,630,478 B2 * | 1/2014 | Silver | 382/141 |
| 2006/0287829 A1 * | 12/2006 | Pashko-Paschenko | 701/301 |
| 2008/0004807 A1 | 1/2008 | Kimura et al. | |
| 2012/0323479 A1 * | 12/2012 | Nagata | 701/301 |
| 2013/0096373 A1 * | 4/2013 | Chabanas et al. | 600/101 |
| 2013/0204516 A1 * | 8/2013 | Fukamachi | 701/300 |

FOREIGN PATENT DOCUMENTS

| | | |
|---|---|---|
| JP | 2007 310572 | 11/2007 |
| JP | 2008 6922 | 1/2008 |
| WO | 2009/007843 A2 | 1/2009 |

* cited by examiner

RISK CALCULATION APPARATUS

The present invention relates to a risk calculation apparatus and in particular, to a risk calculation apparatus for calculating risk in the vicinity of a host vehicle.

BACKGROUND ART

In order to increase the safety of traveling, an apparatus that calculates the potential risk in the vicinity of a vehicle has been proposed. For example, Patent Literature 1 discloses a driving assistance apparatus for a vehicle that calculates the potential risk due to the kinetic energy of a host vehicle, the potential risk due to the traveling rules, the potential risk due to the proximity to an obstacle, and the potential risk due to an interrupt vehicle. The apparatus disclosed in Patent Literature 1 selects the larger of the potential risk due to the kinetic energy and the potential risk due to the proximity and applies a reaction force changing continuously to an accelerator pedal and a steering wheel. The apparatus disclosed in Patent Literature 1 preferentially selects the potential risk due to an interrupt vehicle between the potential risk due to the traveling rules and the potential risk due to an interrupt vehicle and further applies a reaction force increasing in a stepwise manner to the accelerator pedal and the steering wheel.

CITATION LIST

Patent Literature

[Patent Literature 1] Japanese Unexamined Patent Application

SUMMARY OF INVENTION

Technical Problem

In the technique described above, however, the risk of an obstacle is calculated by determining whether the obstacle is a moving object, such as another vehicle, or a stationary object, such as a building, from the information acquired by a sensor, such as a laser radar. For this reason, there is a disadvantage in that the computational load for calculating the risk of moving objects is high. In addition, for a stationary object, determination regarding whether the stationary object is a fixed object, such as a building which is always present in that location, or a movable object, such as another vehicle, is not performed.

In the technique described above, in order to determine whether the obstacle is a moving object or a stationary object from the information acquired by the sensor, specific processing of the information acquired by the sensor is necessary. In addition, when it is also determined whether a stationary object is merely a stationary vehicle or a fixed building that is not movable, a higher computational load is required.

The present invention has been made in consideration of such a situation, and it is an object of the present invention to provide a risk calculation apparatus capable of calculating the risk due to movable objects with less computational load.

Solution to Problem

The present invention is a risk calculation apparatus including a moving object risk calculation unit that calculates, on the basis of the risk due to objects at each of a plurality of points set in the vicinity of a host vehicle, a total value at all points for a moving object risk due to movable objects at each point. The moving object risk calculation unit calculates the total value of the moving object risk at all points by subtracting a total value at all points for a fixed object risk due to immovable objects, which is fixed at each point, from a total value at all points for a risk due to objects at each point.

According to this configuration, the moving object risk calculation unit calculates, on the basis of the risk due to objects at each of the plurality of points set in the vicinity of the host vehicle, the total value at all points for the moving object risk due to movable objects at each point. In this manner, it is possible to acquire the risk due to moving objects, such as another vehicle that is traveling or is stationary or a pedestrian who is walking or is stationary. In addition, the moving object risk calculation unit calculates the total value of the moving object risk at all points by subtracting the total value at all points for the fixed object risk due to immovable objects, which is fixed at each point, from the total value at all points for the risk due to objects at each point. Therefore, since it is not necessary to distinguish between movable objects and immovable objects at each point, the moving object risk calculation unit can calculate the total value of the moving object risk with less computational load.

In this case, the moving object risk calculation unit may acquire the total value of the fixed object risk at all points on the basis of the total value of the fixed object risk at all points, which is set in advance for each position on a map, and a position of the host vehicle on the map.

According to this configuration, the moving object risk calculation unit acquires the total value of the fixed object risk at all points on the basis of the total value of the fixed object risk at all points, which is set in advance for each position on the map, and the position of the host vehicle on the map. Accordingly, since the moving object risk calculation unit does not need to detect immovable objects and calculate the risk due to the objects whenever the host vehicle moves to a relevant position, it is possible to calculate the total value of the fixed object risk with less computational load.

In this case, the moving object risk calculation unit may change the total value of the fixed object risk at all points, which is set in advance for each position on the map, on the basis of moving objects detected at each point.

When a new building or a structure is built at the location, a difference is caused between the fixed object risk set in advance and the actual fixed object risk. However, according to this configuration, the moving object risk calculation unit changes the total value of the fixed object risk at all points, which is set in advance for each position on the map, on the basis of moving objects detected at each point. Therefore, it is also possible to meet a case where a new building or the like is built.

In addition, the above risk calculation apparatus may further include a behavior prediction unit that predicts the behavior of movable objects in the vicinity of the host vehicle. The behavior prediction unit may predict the behavior of movable objects in the vicinity of the host vehicle at predetermined intervals, and decrease the interval as the total value of the moving object risk at all points calculated by the moving object risk calculation unit increases.

According to this configuration, the behavior prediction unit predicts the behavior of movable objects in the vicinity of the host vehicle. In addition, the behavior prediction unit predicts the behavior of movable objects in the vicinity of the host vehicle at predetermined intervals, and decreases the interval as the total value of the moving object risk at all points calculated by the moving object risk calculation unit increases. Therefore, it is possible to improve safety by improving the accuracy of prediction when the total value of the moving object risk is large, and it is possible to reduce the computational load while ensuring safety when the total value of the moving object risk is small.

In addition, the above risk calculation apparatus may further include a behavior prediction unit that predicts the behavior of movable objects in the vicinity of the host vehicle. The behavior prediction unit may calculate a probability that movable objects in the vicinity of the host vehicle are present at each predetermined position, and increase a variance of distribution of the probability as the total value of the moving object risk at all points calculated by the moving object risk calculation unit increases.

According to this configuration, the behavior prediction unit predicts the behavior of movable objects in the vicinity of the host vehicle. In addition, the behavior prediction unit calculates the probability that movable objects in the vicinity of the host vehicle are present at each predetermined position, and increases the variance of distribution of the probability as the total value of the moving object risk at all points calculated by the moving object risk calculation unit increases. Therefore, safer prediction can be performed as the total value of the moving object risk increases.

In addition, the above risk calculation apparatus may further include a driving assistance unit that assists the driving of a driver of the host vehicle. The driving assistance unit increases an amount by which the driving of the driver of the host vehicle is assisted as the total value of the moving object risk at all points calculated by the moving object risk calculation unit increases.

According to this configuration, the driving assistance unit assists the driving of the driver of the host vehicle. In addition, the driving assistance unit increases the amount by which the driving of the driver of the host vehicle is assisted as the total value of the moving object risk at all points calculated by the moving object risk calculation unit increases. In this manner, driving assistance according to the total value of the moving object risk is possible.

Advantageous Effects of Invention

According to the risk calculation apparatus of the present invention, it is possible to calculate the risk due to movable objects with less computational load.

DESCRIPTION OF EMBODIMENTS

Figure 1:
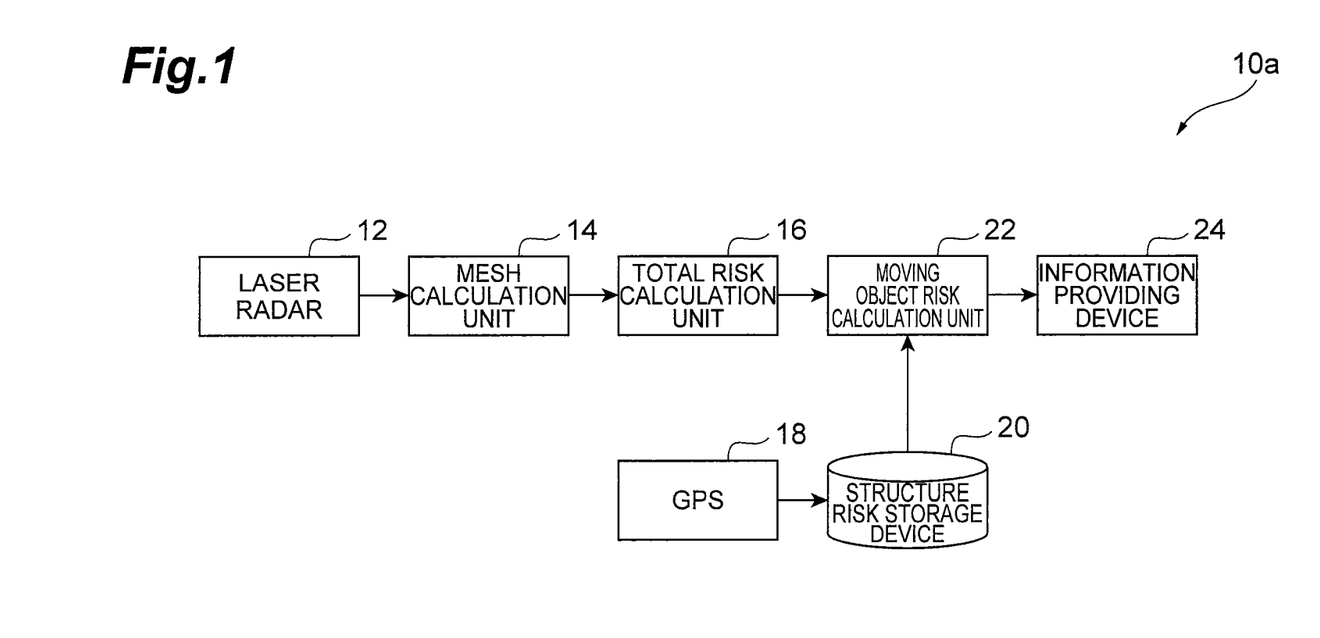
FIG. 1 is a block diagram showing the configuration of a driving assistance apparatus related to a first embodiment.

Hereinafter, a first embodiment of the present invention will be described with reference to the drawings. In the present embodiment, a risk calculation apparatus of the present invention is applied to a driving assistance apparatus. As shown in FIG. 1, a driving assistance apparatus 10a of the present embodiment includes a laser radar 12, a mesh calculation unit 14, a total risk calculation unit 16, a GPS 18, a structure risk storage device 20, a moving object risk calculation unit 22, and an information providing device 24.

The laser radar (Lidar) 12 is for detecting objects at each point set in the vicinity of a host vehicle, regardless of whether the objects are moving objects or fixed objects, by measuring scattered light with respect to the irradiation of laser light that is emitted in a pulse form.

The mesh calculation unit 14 is for setting a mesh, which is a lattice-shaped region, in the vicinity of a host vehicle and calculating the risk at each point of intersection of the mesh. The total risk calculation unit 16 is for calculating the total value of the risk due to objects in the vicinity of the host vehicle by summing the risk at each point of intersection of the mesh.

The GPS (Global Positioning System) 18 is for measuring the position of the host vehicle. The structure risk storage device 20 is a database in which the total value of the risk due to fixed objects, such as an immovable building, at each point of intersection of the mesh when the host vehicle is located at the point is stored for each point on a map.

As described later, the moving object risk calculation unit 22 is for calculating the total value of the risk due to moving objects in the vicinity of the host vehicle on the basis of the total value of the risk due to objects in the vicinity of the host vehicle calculated by the total risk calculation unit 16 and the total value of the risk due to fixed objects extracted from the structure risk storage device 20.

The information providing device 24 displays the total value of the risk due to moving objects, which is calculated by the moving object risk calculation unit 22, for the driver of the host vehicle. Specifically, the information providing device 24 is a display or a speaker. The information providing device 24 not only presents the total value of the risk due to moving objects to the driver of the host vehicle through an image or a voice but also assists the driving of the driver of the host vehicle on the basis of the total value of the risk due to moving objects.

Figure 2:
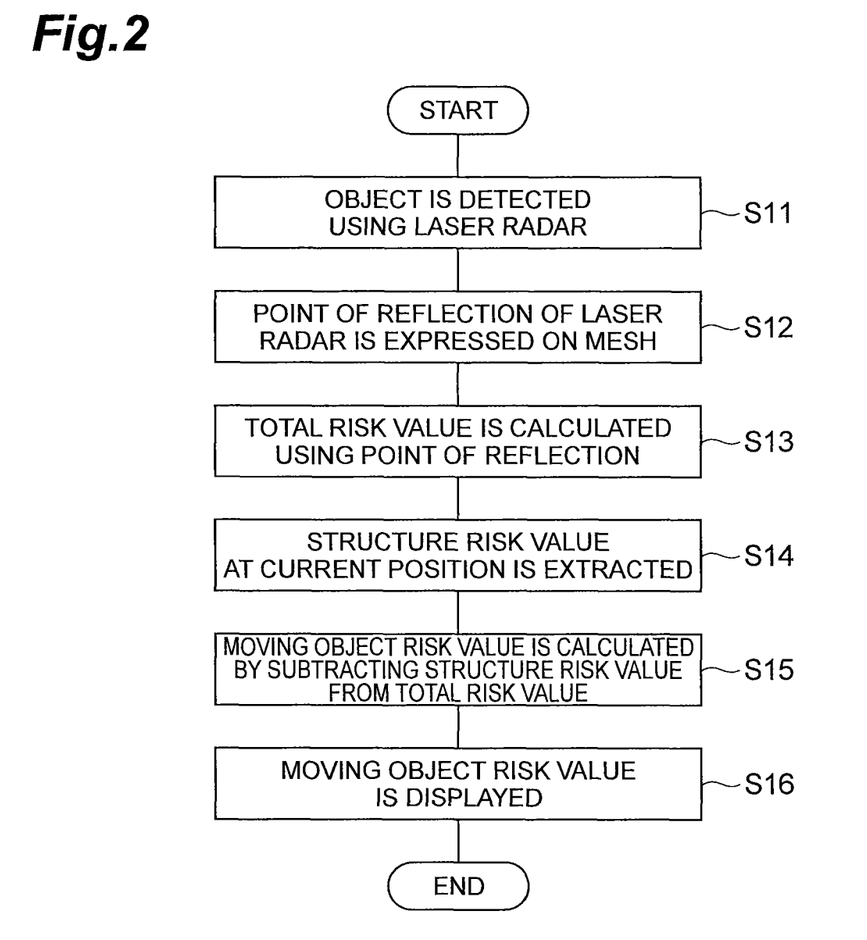
FIG. 2 is a flow chart showing an operation of the driving assistance device related to the first embodiment.

Hereinafter, an operation of the driving assistance apparatus 10a of the present embodiment will be described. As shown in FIG. 2, the driving assistance apparatus 10a detects objects in the vicinity of the host vehicle using the laser radar 12 (S11). The mesh calculation unit 14 of the driving assistance apparatus 10a expresses the point of reflection of laser light from the laser radar 12 on the mesh (S12).

Figure 3:
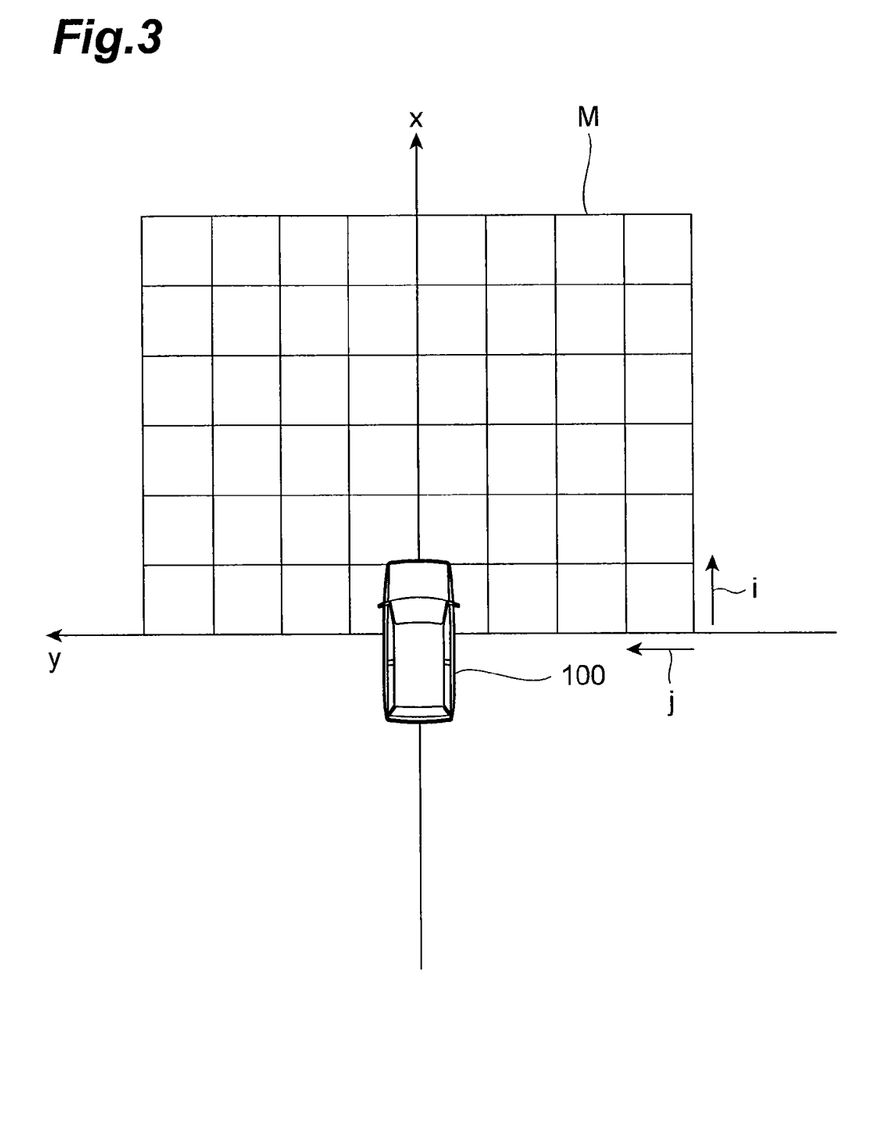
FIG. 3 is a view showing a mesh related to the first embodiment.
Figure 4:
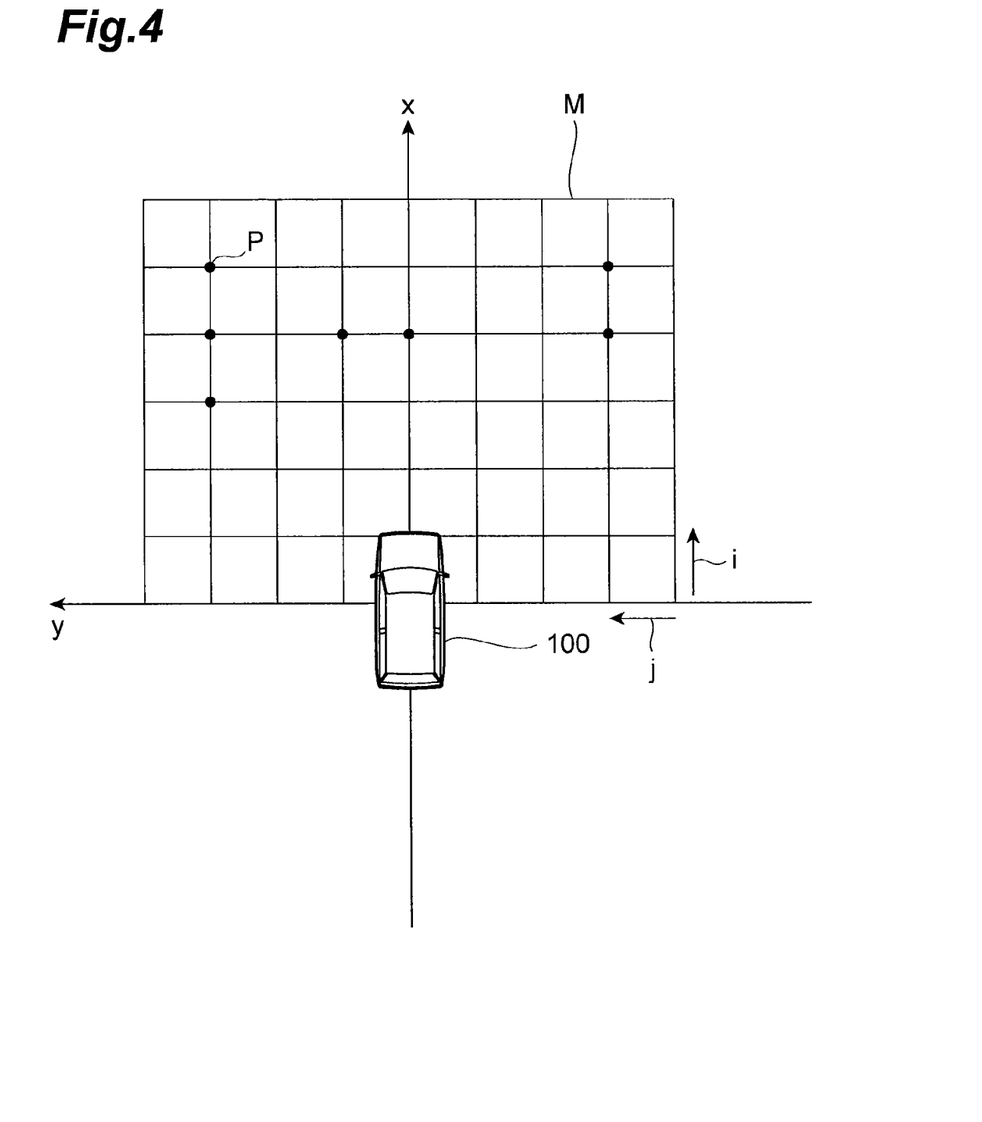
FIG. 4 shows a view when a point of reflection of a laser radar is expressed in the mesh of FIG. 3.

As shown in FIG. 3, the mesh calculation unit 14 sets a mesh M which is a lattice-shaped region in the vicinity of a host vehicle 100. the size of each lattice-shaped region of the mesh M is the size of a unit vector i in an X-axis direction and a unit vector j in a Y-axis direction. As shown in FIG. 4, the mesh calculation unit 14 expresses a presence probability P of objects, which are relevant to the point of reflection, at the point of intersection of the mesh M.

Here, the presence probability P is a probability that objects are present at the point of intersection of the mesh M. The mesh calculation unit 14 calculates the presence probability $P(x, y)$ at each point of intersection of the mesh M in consideration of the reliability of detection of the laser radar 12 and the spread of probability distribution.

The total risk calculation unit 16 calculates the total value at all points of intersection for the risk at each point of intersection of the mesh M using the point of reflection of laser light from the laser radar 12 (S13). The total risk calculation unit 16 calculates the total value $R_{all}$ at all points of intersection for the risk at each point of intersection of the mesh M by the following Expression (1). In the following Expression (1), f(P(x, y)) indicates an expression for conversion from the presence probability P to the risk. For example, like f(P)=A× P, this is obtained by multiplying the presence probability P by the fixed gain A.

$$R_{all} = \Sigma\{f(P(x, y))\} \quad (1)$$

The total value at all points of intersection of the mesh M is stored in advance in the structure risk storage device 20 for the risk due to immovable fixed objects at each point of intersection of the mesh M when a case where the host vehicle 100 is located at each position on the map is assumed. The moving object risk calculation unit 22 extracts the total value of the risk due to fixed objects, which corresponds to the position of the host vehicle detected by the GPS 20, from the structure risk storage device 20 (S14).

The moving object risk calculation unit 22 calculates the total value of the risk due to moving objects at all points of intersection of the mesh M by subtracting the total value of the risk due to fixed objects, which corresponds to the position of the host vehicle extracted in S14, from the total value $R_{all}$ of the risk at each point of intersection of the mesh M calculated in S13 (S15).

The information providing device 24 displays the total value of the risk due to moving objects for the driver of the host vehicle 100 (S16). The information providing device 24 can increase the frequency with which information is given to the driver, the size of the video display, the brightness of the video display, and sound volume as the total value of the risk due to moving objects increases. In this manner, it is possible to prompt the driver to perform safety-oriented action. Alternatively, the driving assistance apparatus 10*a* may perform compulsory intervention using an actuator for accelerator operation, brake operation, and steering operation of the host vehicle 100 as the total value of the risk due to moving objects increases.

According to the present embodiment, the moving object risk calculation unit 22 calculates the total value at all points of intersection of the mesh M for the risk due to moving objects at each point of intersection on the basis of the risk due to objects at each point of intersection in the plurality of meshes M set in the vicinity of the host vehicle 100. In this manner, it is possible to acquire the risk due to moving objects, such as another vehicle that is traveling or is stationary or a pedestrian who is walking or is stationary. In addition, the moving object risk calculation unit 22 calculates the total value of the risk due to moving objects at all points of intersection of the mesh M by subtracting the total value of the risk due to immovable objects, which are fixed at each point of intersection, at all points of intersection of the mesh M from the total value of the risk due to objects. Therefore, since it is not necessary to distinguish between movable objects and immovable objects at each point of intersection of the mesh M, the moving object risk calculation unit 22 can calculate the total value of the risk due to moving objects in a short time with less computational load.

In the present embodiment, objects at each point of intersection of the plurality of meshes M set in the vicinity of the host vehicle 100 are detected by the laser radar 12. Determination of the laser radar 12 regarding whether objects are moving objects or fixed objects is relatively difficult. However, the accuracy when the laser radar 12 detects whether or not objects are present is high. In the present embodiment, the laser radar 12 does not need to distinguish between moving objects and fixed objects, and the high detection accuracy regarding whether or not there are objects is preferred. Accordingly, it is possible to take advantage of the characteristics of the laser radar 12.

In addition, according to the present embodiment, the moving object risk calculation unit 22 acquires the total value of the risk due to fixed objects at all points of intersection of the mesh M on the basis of the risk due to fixed objects, which is set in advance for each position on the map stored in the structure risk storage device 20, and the position of the host vehicle 100 on the map. Accordingly, the moving object risk calculation unit 22 does not need to detect immovable objects and calculate the risk due to the objects whenever the host vehicle 100 moves to a relevant position. As a result, it is possible to calculate the total value of the risk due to fixed objects with less computational load.

In addition, according to the present embodiment, the information providing device 24 assists the driving of the driver of the host vehicle 100. In addition, the information providing device 24 increases the amount by which the driving of the driver of the host vehicle 100 is assisted as the total value of the risk due to moving objects at all points of intersection of the mesh M, which has been calculated by the moving object risk calculation unit 22, increases. In this manner, driving assistance according to the total value of the risk due to moving objects is possible.

Hereinafter, a second embodiment of the present invention will be described. The present embodiment is different from the first embodiment described above in that the risk due to fixed objects set in advance for each position on the map of the structure risk storage device 20 is changed on the basis of moving objects detected at each point of intersection of the mesh M.

Figure 5:
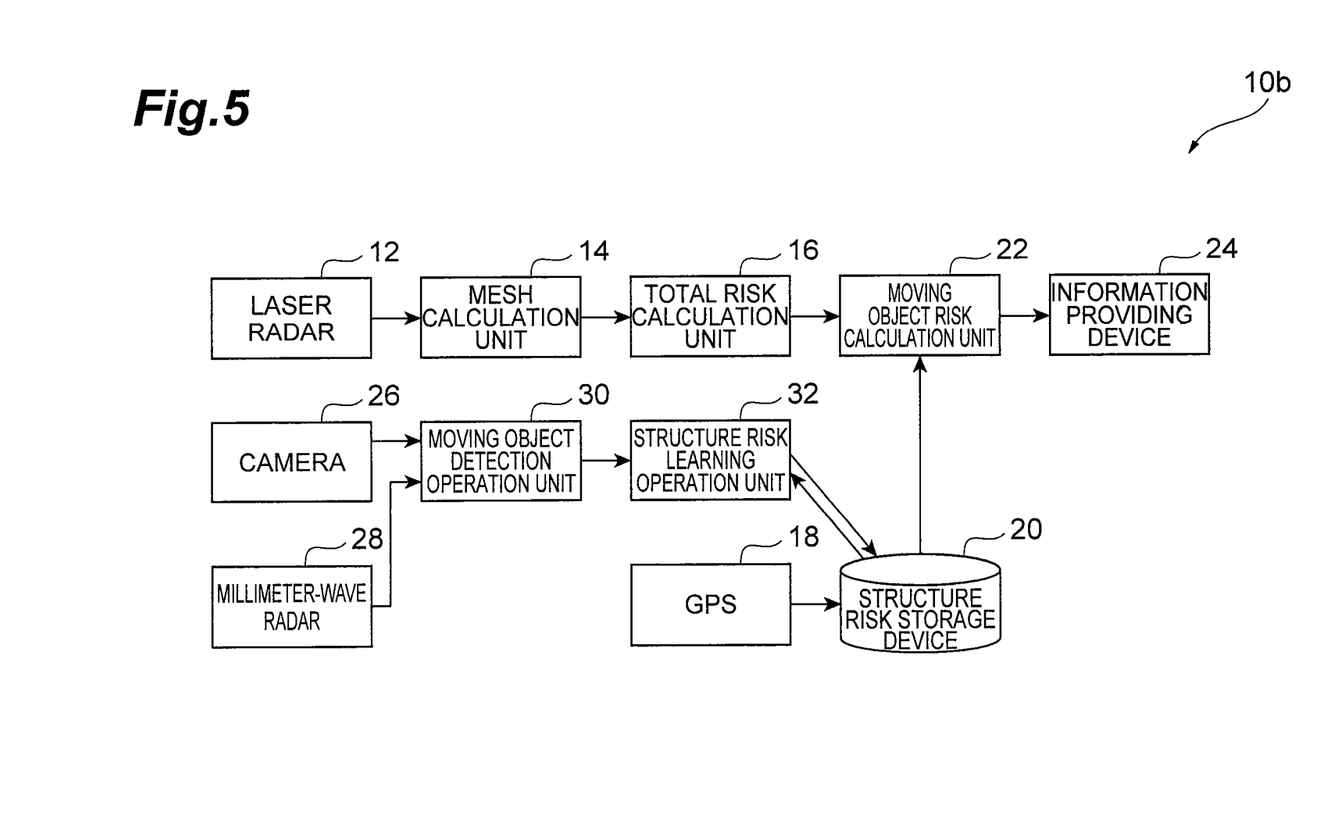
FIG. 5 is a block diagram showing the configuration of a driving assistance apparatus related to a second embodiment.

As shown in FIG. 5, a driving assistance apparatus 10*b* of the present embodiment includes a camera 26, a millimeter-wave radar 28, a moving object detection calculation unit 30, and a structure risk learning operation unit 32 in addition to the components of the driving assistance apparatus 10*a* in the first embodiment described above. The camera 26 and the millimeter-wave radar 28 are for detecting moving objects or fixed objects present in the vicinity of the host vehicle 100. As the camera 26, it is possible to use a stereo camera or the like that can easily detect a change in the distance of each object from the host vehicle 100. The millimeter-wave radar 28 can detect a change in the distance of each object from the host vehicle 100 by detecting Doppler displacement of a reflected wave.

The moving object detection calculation unit 30 is for specifying moving objects and fixed objects present at the point of intersection of the mesh M from the detection results of the camera 26 and the millimeter-wave radar 28. The structure risk learning operation unit 32 is for changing the value stored in the structure risk storage device 20 on the basis of moving objects and fixed objects present at the point of intersection of the mesh M, which have been specified by the moving object detection calculation unit 30.

Figure 6:
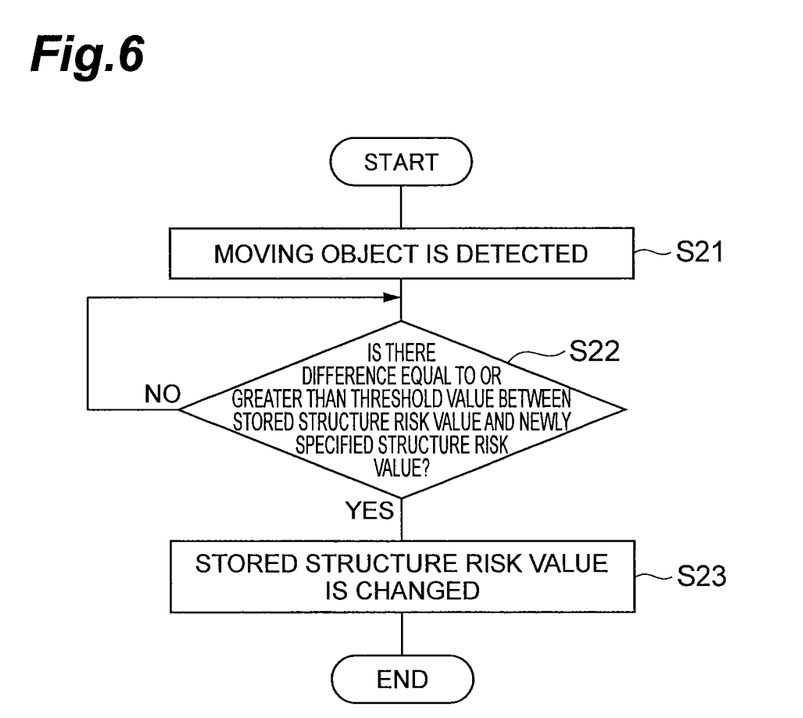
FIG. 6 is a flow chart showing an operation of the driving support apparatus related to the second embodiment.

Hereinafter, an operation of the driving assistance apparatus 10*b* of the present embodiment will be described. As shown in FIG. 6, the camera 26, the millimeter-wave radar 28, and the moving object detection calculation unit 30 detect moving objects or fixed objects present in the vicinity of the host vehicle 100 (S21).

The structure risk learning operation unit 32 calculates the total value of the risk due to fixed objects at all points of intersection of the mesh M, at the position of the host vehicle 100, from the moving objects or the fixed objects present at the points of intersection of the mesh M that have been specified by the moving object detection calculation unit 30. The structure risk learning operation unit 32 compares the total value of the risk due to fixed objects at the position of the host vehicle 100, which is stored in the structure risk storage device 20, with the total value of the risk due to fixed objects that has been newly specified by the moving object detection calculation unit 30 (S22).

When there is a difference equal to or greater than a predetermined threshold value between the total value of the risk due to fixed objects stored in the structure risk storage device 20 and the total value of the risk due to fixed objects newly specified by the moving object detection calculation unit 30 (S22), the structure risk learning operation unit 32 changes the total value of the risk due to fixed objects stored in the structure risk storage device 20 to the total value of the risk due to fixed objects that have been newly specified by the moving object detection calculation unit 30 (S23).

The structure risk learning operation unit 32 can specify moving objects and fixed objects using the moving object detection calculation unit 30 whenever the host vehicle 100 passes through a relevant point. For a plurality of results (for example, last and current results) of the specification of moving objects and fixed objects by the moving object detection calculation unit 30, the structure risk learning operation unit 32 estimates a higher importance for more recent specification results, and therefore it is possible to change the total value of the risk due to fixed objects stored in the structure risk storage device 20. In this manner, it is possible to improve the accuracy of learning by the structure risk learning operation unit 32.

When a new building or a structure is built at the location, a difference is caused between the risk due to fixed objects set in advance in the structure risk storage device 20 and the actual risk due to fixed objects. However, according to the present embodiment, the structure risk learning operation unit 32 changes the total value of the risk due to fixed objects, which is set in advance for each position on the map, on the basis of moving object and fixed objects detected for each point of intersection of the mesh M. Therefore, it is also possible to meet a case where a new building or the like is built.

Figure 7:
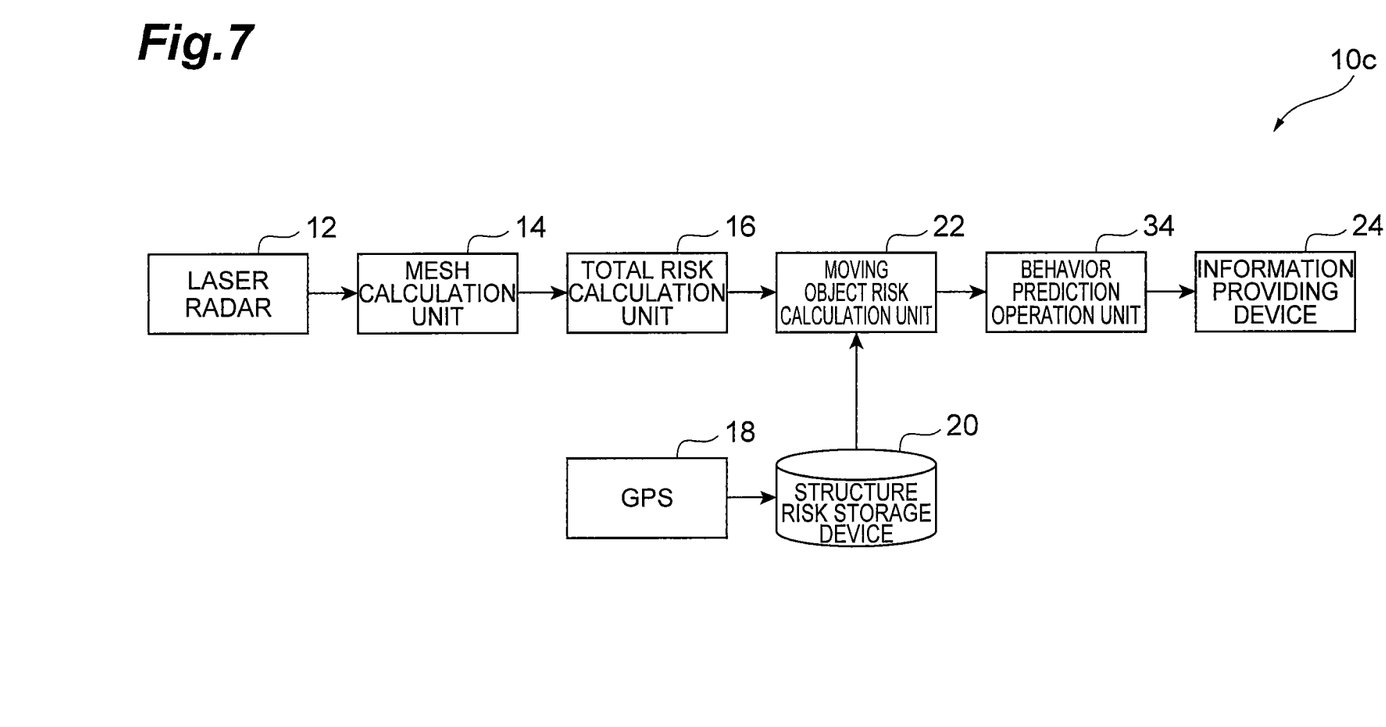
FIG. 7 is a block diagram showing the configuration of a driving assistance apparatus related to a third embodiment.

Hereinafter, a third embodiment of the present invention will be described. The present embodiment is different from the first embodiment described above in that the behavior of movable objects in the vicinity of the host vehicle 100 is predicted. As shown in FIG. 7, a driving assistance apparatus 10c of the present embodiment includes a behavior prediction calculation unit 34 in addition to the components of the driving assistance apparatus 10a described above in the first embodiment. The behavior prediction calculation unit 34 calculates a presence probability that a moving object present in the vicinity of the host vehicle 100 is present at each point of intersection of the mesh M, at predetermined intervals, using the Monte Carlo method.

Figure 8:
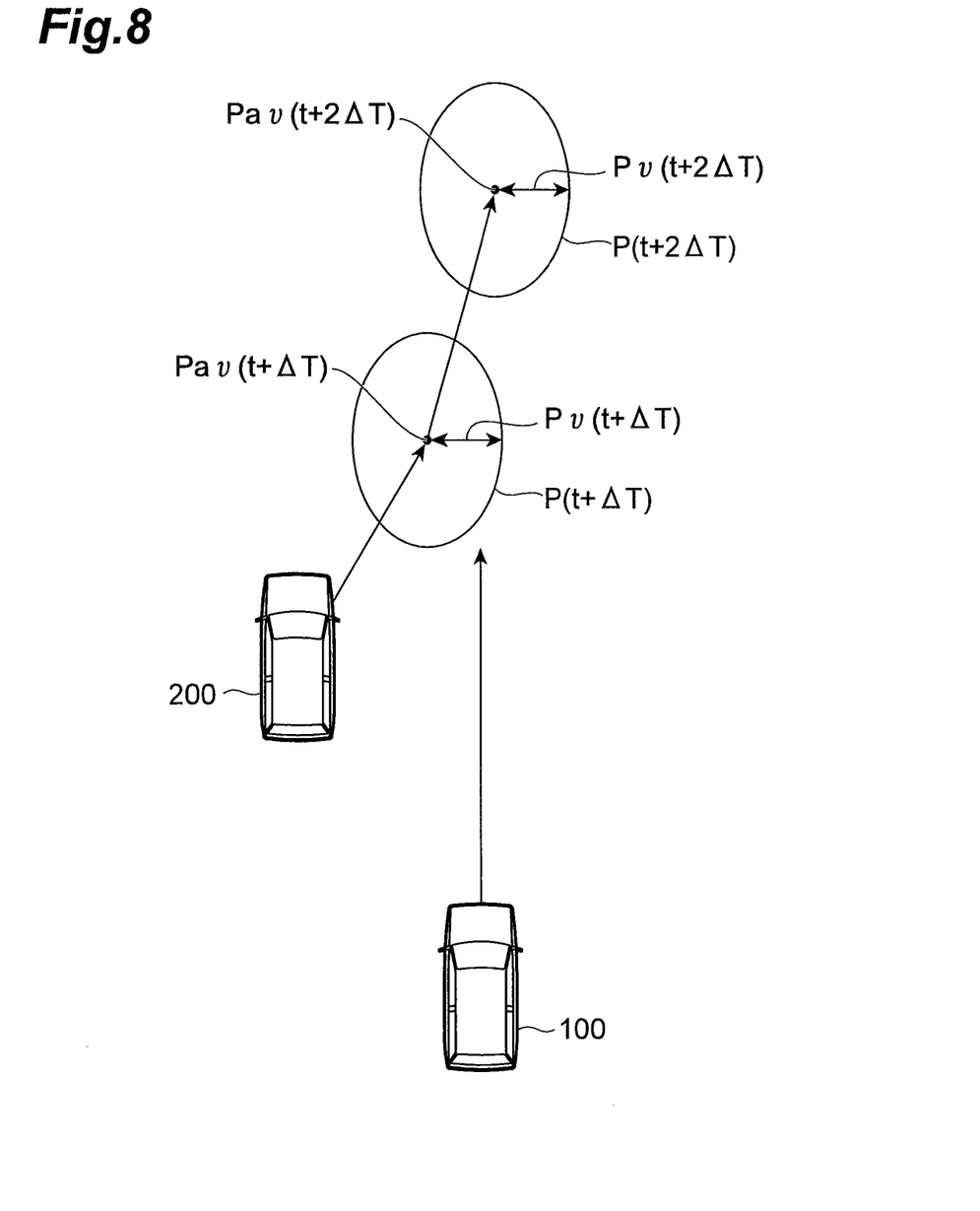
FIG. 8 is a plan view showing a probability distribution for the presence of another vehicle calculated by a behavior prediction calculation unit in FIG. 7.

As shown in FIG. 8, it is assumed that another vehicle 200 is traveling ahead of the host vehicle 100. The behavior prediction calculation unit 34 calculates the presence probability distribution $P(t+\Delta T)$ and the presence probability distribution $P(t+2\Delta T)$ when another vehicle 200 is present at each point of intersection of the mesh M, every prediction sampling time $\Delta T$, using the Monte Carlo method (particle filter). In FIG. 8, the average of the presence probability is expressed as an average $Pav(t+\Delta T)$ and an average $Pav(t+2\Delta T)$. In FIG. 8, the variance of the presence probability is expressed as a variance $Pv(t+\Delta T)$ and a variance $Pv(t+2\Delta T)$.

The behavior prediction calculation unit 34 decreases the variance $Pv(t+\Delta T)$ and the variance $Pv(t+2\Delta T)$ by increasing the prediction sampling time $\Delta T$ or reducing the number of times N of random number generation as the total value of the risk due to moving objects calculated by the moving object risk calculation unit 22 decreases. In addition, the behavior prediction calculation unit 34 increases the variance $Pv(t+\Delta T)$ and the variance $Pv(t+2\Delta T)$ by reducing the prediction sampling time $\Delta T$ or increasing the number of times N of random number generation as the total value of the risk due to moving objects calculated by the moving object risk calculation unit increases. The information providing device 24 displays information for the driver of the host vehicle 100 according to the behavior of another vehicle 200 predicted by the behavior prediction calculation unit 34.

In the present embodiment, the behavior prediction calculation unit 34 predicts the behavior of moving objects, such as another vehicle 200 in the vicinity of the host vehicle 100. The behavior prediction calculation unit 34 calculates a probability that moving objects in the vicinity of the host vehicle 100 are present at each predetermined position every prediction sampling time $\Delta T$, and decreases the prediction sampling time $\Delta T$ as the total value of the risk due to moving objects calculated by the moving object risk calculation unit 22 increases. Therefore, it is possible to improve safety by improving the accuracy of prediction when the total value of the risk due to moving objects is large, and it is possible to reduce the computational load while ensuring safety when the total value of the moving object risk is small.

In addition, in the present embodiment, the behavior prediction calculation unit 34 increases the variance $Pv(t+\Delta T)$ of the presence probability distribution $P(t+\Delta T)$ as the total value of the risk due to moving objects calculated by the moving object risk calculation unit 22 increases. Therefore, safer prediction can be performed as the total value of the risk due to moving objects increases.

While the embodiments of the present invention have been described, the present invention is not limited to the above-described embodiments and various modifications may also be made.

INDUSTRIAL APPLICABILITY

According to the risk calculation apparatus of the present invention, it is possible to calculate the risk due to a movable object with less computational load.

Reference Signs List

10a, 10b, 10c: driving assistance apparatus
12: laser radar
14: mesh calculation unit
16: total risk calculation unit
18: GPS
20: structure risk storage device
22: moving object risk calculation unit
24: information providing device
26: camera
28: millimeter-wave radar
30: moving object detection calculation unit
32: structure risk learning operation unit
34: behavior prediction calculation unit
100: host vehicle
200: another vehicle

The invention claimed is:

1. A risk calculation apparatus comprising:
a moving object risk calculation unit that calculates, on the basis of a risk due to objects at each of a plurality of points set in the vicinity of a host vehicle, a total value at all of the points for a moving object risk due to movable objects at each of the points, wherein the moving object risk calculation unit calculates the total value of the moving object risk at all of the points by subtracting a total value at all of the points for a fixed object risk due to immovable objects, which are fixed at each of the points, from a total value at all of the points for a risk due to objects at each of the points.

2. The risk calculation apparatus according to claim 1, wherein the moving object risk calculation unit acquires the total value of the fixed object risk at all of the points on the basis of the total value of the fixed object risk at all of the points, which is set in advance for each position on a map, and a position of the host vehicle on the map.

3. The risk calculation apparatus according to claim 2, wherein the moving object risk calculation unit changes the total value of the fixed object risk at all of the points, which is set in advance for each position on the map, on the basis of moving objects detected at each of the points.

4. The risk calculation apparatus according to claim 1, further comprising:
   a behavior prediction unit that predicts behavior of movable objects in the vicinity of the host vehicle,
   wherein the behavior prediction unit predicts behavior of movable objects in the vicinity of the host vehicle at predetermined intervals, and decreases the interval as the total value of the moving object risk at all of the points calculated by the moving object risk calculation unit increases.

5. The risk calculation apparatus according to claim 1, further comprising:
   a behavior prediction unit that predicts behavior of movable objects in the vicinity of the host vehicle,
   wherein the behavior prediction unit calculates a probability that movable objects in the vicinity of the host vehicle are present at each predetermined position, and increases a variance of distribution of the probability as the total value of the moving object risk at all of the points calculated by the moving object risk calculation unit increases.

6. The risk calculation apparatus according to claim 1, further comprising:
   a driving assistance unit that assists driving of a driver of the host vehicle,
   wherein the driving assistance unit increases an amount by which the driving of the driver of the host vehicle is assisted as the total value of the moving object risk at all of the points calculated by the moving object risk calculation unit increases.

\* \* \* \* \*